United States Patent
Boonekamp

(10) Patent No.: US 8,534,896 B2
(45) Date of Patent: Sep. 17, 2013

(54) FREE FORM LIGHTING MODULE

(75) Inventor: Erik Boonekamp, Utrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/382,959

(22) PCT Filed: Jul. 5, 2010

(86) PCT No.: PCT/IB2010/053066
§ 371 (c)(1), (2), (4) Date: Jan. 9, 2012

(87) PCT Pub. No.: WO2011/004306
PCT Pub. Date: Jan. 13, 2011

(65) Prior Publication Data
US 2012/0113679 A1  May 10, 2012

(30) Foreign Application Priority Data
Jul. 10, 2009 (EP) .................................... 09165129

(51) Int. Cl.
*F21V 7/04* (2006.01)
(52) U.S. Cl.
USPC ............................. 362/607; 362/609; 362/627
(58) Field of Classification Search
USPC .................. 362/606, 607, 609, 617, 618, 619, 362/623, 624, 627
See application file for complete search history.

(56) References Cited

U.S. PATENT DOCUMENTS

| | | | |
|---|---|---|---|
| 4,105,293 A * | 8/1978 | Aizenberg et al. | 362/627 |
| 2004/0052088 A1 * | 3/2004 | Meiers et al. | 362/551 |
| 2005/0062913 A1 | 3/2005 | Choi et al. | |
| 2006/0055843 A1 | 3/2006 | Hahm et al. | |
| 2006/0227571 A1 * | 10/2006 | Kuo | 362/619 |
| 2007/0127261 A1 | 6/2007 | An et al. | |
| 2007/0274096 A1 * | 11/2007 | Chew et al. | 362/609 |
| 2008/0030974 A1 | 2/2008 | Abu-Ageel | |
| 2008/0037284 A1 * | 2/2008 | Rudisill | 362/629 |
| 2009/0140962 A1 | 6/2009 | Hwang et al. | |

FOREIGN PATENT DOCUMENTS

| | | |
|---|---|---|
| GB | 2430071 A | 3/2007 |
| WO | 2006097859 A2 | 9/2006 |
| WO | 2008020686 A1 | 2/2008 |
| WO | 2008126023 A2 | 10/2008 |

\* cited by examiner

*Primary Examiner* — Y My Quach Lee
(74) *Attorney, Agent, or Firm* — Mark L. Beloborodov

(57) ABSTRACT

The invention provides an illumination device comprising a waveguide having a first face, a second face, and a waveguide edge. The device further comprises a LED light source, wherein the LED light source is arranged to couple at least part of the light source light into the waveguide element. The device also comprises a first transmissive reflector, arranged at the first face side, and a second transmissive reflector, arranged at the second face side. The LED light source, the waveguide, the first transmissive reflector, and the second transmissive reflector, are arranged to generate the first and second light in a direction away from the first face and in a direction away from the second face, respectively. Such an illumination device may allow lighting of a room, for instance via the ceiling with uplight, and lighting of a specific area in the room with downlight.

13 Claims, 7 Drawing Sheets

FREE FORM LIGHTING MODULE

FIELD OF THE INVENTION

The invention relates to an illumination device comprising a waveguide.

BACKGROUND OF THE INVENTION

Waveguide systems in lighting, especially in LCD backlighting, are known in the art.

GB 2430071 for instance has for its object to provide a backlight unit having good display quality, and a liquid crystal display device provided with the same. To that end, a light source, a reflection sheet, a light guide plate, a gas space, and a diffusion plate are installed. The reflection sheet, light guide plate, gas space, and a diffusion plate are superposed in the order mentioned. The light source is in the form of individual light sources having different spectra or different amounts of luminescence and is disposed in the vicinity of the incident surface of the light guide plate. The surface of the light guide plate opposite the reflecting sheet is provided with scattering dots, whereby the light transmitted through the light guide plate is taken out to the reflection plate side.

US 2004183962 describes a backlight module for providing light with a more uniform light distribution and greater brightness. The backlight module includes at least a luminary for providing light, a light guide assembly disposed adjacent to the luminary for guiding a first portion of the light, a translucent membrane with a plurality of openings thereon, and a reflector disposed below the light guide assembly. A second portion of the light passes upwardly through the openings and a third portion of the light is directed upwardly by the light guide assembly after being reflected by the translucent membrane and the reflector. The light guide assembly includes a plurality of light guide plates, wherein the bottom of at least one light guide plate can be a triangular concave or an arc concave, and the light guide plates can have some doping particles therein.

Further, US 2006055843 describes an LCD backlight apparatus which includes a light guide plate placed under an LCD panel of the LCD to guide light to the LCD panel. The light guide plate has an even upper surface and a scattering pattern formed in a bottom surface. A plurality of monochromatic light sources are placed in line at a side of the light guide plate to radiate light along the plane direction of the light guide plate between the upper and bottom surfaces of the light guide plate. The light sources are adapted to radiate light beams at a predetermined beam angle, so that the light beams reach the scattering pattern only after having travelled a predetermined reference distance necessary for forming white light when they are mixed together. The LCD backlight apparatus can reduce the bezel width without increasing the thickness of an LCD.

SUMMARY OF THE INVENTION

Prior art systems may not have the ability of providing light to both sides of a flat waveguide. There is however a desire to provide a lighting device that is able to provide light in two directions: for instance uplight directed to a ceiling to provide indirect illumination that can be used as atmosphere/mood lighting and downlight for target (task) lighting. Uplight may contribute to a more convenient lighting of a space, such as a room or an office, and may contribute to the fulfillment of the UGR (unified glare rating) norm for offices. Such a device may be used in homes, offices, hospitality areas, etc. There is further a desire to provide such a device wherein the relative amounts of uplight and downlight are tuneable.

Hence, it is an object of the invention to provide an alternative illumination device, which preferably further at least partly obviates one or more of the above-described drawbacks, and which may further preferably fulfill one or more of the above-indicated desires.

To achieve this, the invention provides, in a first aspect, an illumination device, arranged to generate first and second light in opposite directions, comprising:

a. a waveguide element comprising a first face (hereinafter often also indicated as "top face", for the sake of understanding), a second face (hereinafter often also indicated as "bottom face", for the sake of understanding), and a waveguide edge;

b. a LED light source, arranged to generate light source light, with optional collimating optics, wherein the LED light source with optional collimating optics is arranged to couple at least part of the light source light into the waveguide element via the waveguide edge of the waveguide element to provide waveguide light; and c. a first transmissive reflector, arranged at the first face side, and a second transmissive reflector, arranged at the second face side, wherein the LED light source with optional collimating optics, the waveguide element, the first transmissive reflector, and the second transmissive reflector, are arranged to generate the first and second light (hereinafter often also indicated as "uplight" and "downlight, respectively, for the sake of understanding,) in a direction away from the first face and in a direction away from the second face, respectively.

Such an illumination device may allow lighting of a room, for instance via the ceiling with uplight, and lighting of a specific area in the room with downlight. Both the arrangement and the kind of structures (see also below) allow tuning the ratio of downlight and uplight (for instance at the manufacturer). Further, a relatively thin illumination device may be provided, which may for instance suspend from a ceiling. The ratio of downlight and uplight may for instance be in the range of 0.01-100, such as 1-10, like 2-5. A typical up/down ratio may be in the range of 0.2 to 0.8.

Preferably, at least one of the first face and/or the second face comprises structures to couple out light, preferably via the second face and/or the first face, respectively, to provide light propagating in a direction away from said second face or said first face, respectively. Due to those structures at a face, light may be reflected and coupled out via the opposite face. Hence, the first transmissive reflector or the second transmissive reflector may comprise the structures at the first face or the second face, respectively. The uplight to downlight ratio may amongst others be controlled by the reflectivity of the first transmissive reflector and the second transmissive reflector, including the pattern of the structures, such as dot/stripe density. The first transmissive reflector and the second transmissive reflector may include one or more of a diffuser (such as a diffuser plate or foil) and glare-suppression optics (such as a glare-suppression plate or foil), see also below. Hence, the invention provides in an embodiment an illumination device in which one or more of the first transmissive reflector and the second transmissive reflector comprise structures arranged at the first face or second face, and arranged to couple at least part of the waveguide light out of the waveguide element via the second face or first face, respectively.

In general, the waveguide element will have the form of a plate, especially a thin plate having for instance a thickness in the range of about 0.1-20 mm, such as 1-10 mm. The waveguide element may be flat or curved; the waveguide may also have a wave shape. Preferably, the first and the second face are arranged substantially parallel (which includes parallel curved faces). Further, the waveguide element may have any shape, such as selected from the group comprising square, rectangular, round, oval, triangular, pentagonal, hexagonal, etc. Hence, the invention provides an illumination device having a "free" shape. Herein, the waveguide element may also be indicated as "waveguide" or "light guide". The total thickness of the illumination device may be in the range of about 1-50 mm, such as 5-15 mm.

The waveguide element may comprises one or more materials selected from the group consisting of a transmissive organic material support, such as selected from the group consisting of PE (polyethylene), PP (polypropylene), PEN (polyethylene naphthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer). However, in another embodiment, waveguide elements may comprise an inorganic material. Preferred inorganic materials are selected from the group consisting of glasses, (fused) quartz, transmissive ceramic materials, and silicones. Especially preferred are PMMA, transparent PVC, or glass as material for the waveguide element.

In a specific embodiment, light from the LED light source is collimated before entering the edge of the waveguide element. The light coupled into the waveguide is herein also indicated as "waveguide light". The illumination device may comprise a plurality of LED light sources with optional collimating optics. The plurality of LED light sources may comprise two or more types of LED light sources arranged to emit at different emission wavelengths, respectively. For instance, blue LEDs and yellow LEDs, or blue LEDs and green LEDs and red LEDs may be provided. Such combinations may be arranged to be able to provide white light. Optionally, one or more of the plurality of LEDs, or one or more subsets of the plurality of LEDs, may be controlled independently of the other LEDs or subset(s) of LED, respectively. The plurality of LED light sources may be distributed evenly or unevenly over the edge of the waveguide. This further contributes to the free form of the illumination device.

The phrase "in a direction away from the first face" indicates that light travels in a direction which is an extension of a propagation from the interior of the waveguide in the direction of the first face. Likewise, the phrase "in a direction away from the second face" indicates that light travels in a direction which is an extension of a propagation from the interior of the waveguide in the direction of the second face. Light emanating from the first and the second face may have an intensity distribution (such as a Lambertian, see also below (I=I(0)*cos (α))), but all directions within such distributions are away from the first and the second face, respectively.

The term "transmissive reflector" refers to optics that may pass at least part of the light and reflect at least part of the light provided to such a transmissive reflector. Some non-limitative examples are described below. The term "transmissive reflector" may also refer to a plurality of transmissive reflectors. The phrase "as a transmissive reflector" does not exclude the presence of other optics having the function of a transmissive reflector.

In an embodiment, the first face comprises structures, arranged to couple at least part of the waveguide light out of the waveguide element via the second face, as first transmissive reflector. Especially, the first face comprises a pattern of reflective dots or stripes as structures. Other structures may also be applied.

In another embodiment, the second face comprises structures, arranged to couple at least part of the waveguide light out of the waveguide element via the first face, as second transmissive reflector. Especially, the second face comprises a pattern of reflective dots or stripes as structures.

Such structures, such as dots or stripes, may be patterned to improve a homogeneous distribution of the light, being light propagating in a direction away from the second face or first face, respectively.

In an embodiment, both the first and the second face comprise structures.

The phrase "first face comprises structures, arranged to couple at least part of the waveguide light out of the waveguide element via the second face" indicates that the first face comprises structures, such as dots or stripes or grooves, etc., that are arranged to promote waveguide light reflection at these structures in the direction of the second face, to promote outcoupling of waveguide light in a direction away from the second face, to provide downlight. Such structures, especially paint dots or stripes, can thus have the function of "mini-downlighters".

The phrase "second face comprises structures, arranged to couple at least part of the waveguide light out of the waveguide element via the first face" indicates that the second face comprises structures, such as dots or stripes or grooves, etc., that are arranged to promote waveguide light reflection at these structures in the direction of the first face, to promote outcoupling of waveguide light in a direction away from the first face, to provide uplight. Such structures, especially paint dots or stripes, can thus have the function of "mini-uplighters".

Such structures may be arranged on or comprised in the first face or the second face or both. In a specific embodiment, the first face comprises a pattern of (white, diffuse) reflective structures, such as dots or stripes.

Such a pattern may be printed on the first face and/or the second face, such as by means of screen printing or inkjet printing. Typical materials may be white pigments, such as $TiO_2$ and/or $Al_2O_3$ comprising pigments. Such pigments may further include a binder. The local density of the outcoupling structures can be optimized to ensure a uniform outcoupling of light over the whole area (of the first face and/or the second face) of the waveguide element. In another embodiment, the structures comprise 3D perturbations to the second surface. An example of patterning for extracting light in a desired direction is described by T. L. R. Davenport et al., "Optimizing density patterns to achieve desired light extraction for displays", Proceedings of SPIE, the International Society for Optical Engineering, ISSN 0277-786X CODEN PSISDG.

In an embodiment, the first face comprises a coating that is arranged as first transmissive reflector to reflect at least part and transmit at least part of the waveguide light at the first face. In yet another embodiment, the second face comprises a coating that is arranged as second transmissive reflector to reflect at least part and transmit at least part of the waveguide light at the second face.

Coatings can be made transmissive and reflective by applying reflective material to the face(s), for instance in such a way that the coating comprises holes through which light can escape (a kind of mirror embodiment of the structures indicated above), or for instance by providing a thin coating that reflects and transmits respective parts of the light.

In an embodiment, both the first and the second face comprise such a coating. Preferably, the coating has structures, to enable outcoupling.

In a specific embodiment, the illumination device further comprises a diffuser, arranged downstream of the second face (second face diffuser). In a further specific embodiment, the illumination device further optionally comprises a diffuser, arranged downstream of the first face (first face diffuser).

Such a diffuser may facilitate mixing of different light rays escaping from the second face. Especially, when a plurality of different emission colors is used, such a diffuser may be beneficial. Typical diffusers are for instance translucent materials. The diffuser may for instance be a holographic diffuser. Also various diffuser foils can be used such as light shaping diffusers from Luminit ("holographic diffusers"), diffusers from Fusion Optix or Bright View Technologies).

The diffuser is especially arranged to diffuse substantially all light escaping from the second face or the first face, respectively. The diffuser may also be arranged to recycle light. Hence, the diffuser may also be arranged as the second or first transmissive reflector, respectively. Thus, the second and/or first transmissive reflector may comprise a diffuser, respectively. The term diffuser may also relate to a plurality of diffusers.

The diffuser may for instance (also) be a plate or foil (or a plurality of plates or foils), having substantially the same shape and area as the second face. In an embodiment, the diffuser extends over substantially the whole surface of the second face or first face, respectively. Hence, in an embodiment, the illumination device comprises a laminate or stack of the waveguide element and diffuser(s). As mentioned below, the term stack may include embodiments where there is no contact between the optical elements of the stack, for instance due to a distance of at least 5 μm between them.

The terms "upstream" and "downstream" relate to an arrangement of items or features relative to the propagation of the light from a light generating means (here the light source, such as the LED), wherein relative to a first position within a beam of light from the light generating means, a second position in the beam of light closer to the light generating means is "upstream", and a third position within the beam of light further away from the light generating means is "downstream".

In yet a further embodiment, the illumination device may further comprise (glare-suppression) optics, arranged downstream of the second face, and, if present, arranged downstream of the optional diffuser (see above). Optionally, in yet a further embodiment, the illumination device may further comprise (glare-suppression) optics (first face (glare-suppression) optics), arranged downstream of the first face, and, if present, arranged downstream of the optional first face diffuser (see above).

The glare-suppression optics is preferably relatively thin, such that a thin illumination device may be provided. An example of a preferred glare-suppression optics is described in WO2006097859 (as a translucent lighting panel), which is incorporated herein by reference.

The glare-suppression optics is especially arranged to pass substantially all light escaping from the second face and the optional (second face) diffuser in such a way that glare may be reduced, or from the first face and the optional (first face) diffuser in such a way that glare may be reduced, respectively. The glare-suppression optics may also be arranged to recycle light. Hence, the glare-suppression optics may also be arranged as second or first transmissive reflector, respectively. Hence, the second and/or first transmissive reflector may comprise glare-suppression optics. The term glare-suppression optics may also relate to a plurality of diffusers.

The glare-suppression optics may for instance (also) be a plate or foil (or a plurality of plates or foils) having substantially the same shape and area as the second face or the first face. In an embodiment, the glare-suppression optics is arranged over substantially the whole surface of the second face or the first face.

Hence, in an embodiment, the illumination device comprises a laminate or stack of the waveguide element and glare-suppression optics (downstream of the first and/or the second face).

In yet another embodiment, wherein the diffuser is present, the glare-suppression optics is arranged over substantially the whole surface of the diffuser.

Hence, in an embodiment, the illumination device comprises a laminate or stack of the waveguide element and glare-suppression optics, or a laminate or stack of the waveguide element, diffuser(s) and glare-suppression optics (downstream of the first and/or the second face).

For instance, the (glare-suppression) optics, such as the translucent lighting panel, may have at its outer side a profiled surface in order to direct the emitted light radiation mainly into a predetermined zone, which light radiation travels at relatively small angles to the direction perpendicular to the plane of the lighting panel, and wherein light radiation at small angles to the plane of the lighting panel is reduced, particularly when the illumination device must have a relatively high intensity. To achieve this, the material of the lighting panel may contain a light-absorbing agent in such a quantity that the intensity of a light beam passing through the lighting panel substantially perpendicularly to the plane of the lighting panel decreases by 1% to 20% due to the presence of the light-absorbing agent. Such a light-absorbing and non-scattering agent, for example, a pigment or a dye, is well known in the art. It has been found that light radiation leaving the profiled surface of the lighting panel at its front side at a relatively small angle to the plane of the lighting panel has followed long paths through the material of the lighting panel, which paths are disproportionally long as compared to the length of the paths of light radiation leaving the lighting panel in a direction within the predetermined zone. Consequently, a relatively small quantity of light-absorbing agent is effective in absorbing light radiation that would otherwise leave the lighting panel at a small angle to the plane of the lighting panel, while this relatively small quantity of light-absorbing agent has a very limited influence on the light radiation that leaves the lighting panel at a relatively small angle to the direction perpendicular to the plane of the lighting panel. In a preferred embodiment, the material of the lighting panel contains a light-absorbing agent in such a quantity that the intensity of a light beam passing through the lighting panel substantially perpendicularly to the plane of the lighting panel decreases by 2% to 15%, preferably 5% to 10%, due to the presence of the light-absorbing agent.

In another preferred embodiment, the outer side of the lighting panel has a profiled surface, at least half of which, preferably more than 75%, more preferably more than 95%, is positioned at an angle between 30° and 45°, preferably between 35° and 38° to the plane of the lighting panel. Optimal results are obtained with a lighting panel made of an acrylic resin or polycarbonate, wherein the surface of the outer side is provided with protrusions, so that all parts of the surface of the outer side are positioned at an angle of 36° to the plane of the lighting panel.

In a further preferred embodiment, the light-absorbing agent is spectrally neutral, i.e. all wavelengths of visible light are absorbed in substantially the same amount, so that the remaining light radiation has substantially the same color as the light radiation emitted by the light source in the illumination device. For certain applications, it will be desired that the illumination device radiates any color of light other than the color of light of the light source.

In another preferred embodiment, the light-absorbing agent absorbs certain wavelengths of visible light to a larger extent than other wavelengths of visible light. Such an agent having a certain spectral absorption will intensify the relevant color in the light radiation at small angles to the plane of the lighting panel to a much larger extent than in said predetermined zone in front of the illumination device. In said predetermined zone, there will be no more than a small amount of color, if any, in the light radiation, whereas the light radiation in other directions will be really colored.

In a preferred embodiment, said outer side of the lighting panel is provided with protrusions having a substantially conical surface that tapers from the base portion of the protrusions which extend in a direction away from the lighting panel. In another preferred embodiment, said outer side of the lighting panel is provided with protrusions having a substantially pyramidal surface that tapers from the base portion of the protrusions which extend in a direction away from the lighting panel. In a top view of the protrusions, substantially the whole circumference of the base portions of the protrusions preferably abuts against similar surrounding protrusions. Optimal results are obtained by using a lighting panel, wherein all parts of the surface at the outer side of the lighting panel are positioned at an angle of about 35°.

The outer side of the lighting panel has in an embodiment a profiled surface, at least half of which is positioned at an angle between 20° and 50° to the plane of the lighting panel, the material of the lighting panel containing a light-absorbing agent in such a quantity that the intensity of a light beam passing through the lighting panel substantially perpendicularly to the plane of the lighting panel decreases by 1% to 20% due to the presence of the light-absorbing agent.

In yet a further embodiment, the illumination device may further comprise a spacing downstream of the second face and upstream of one or more of the diffuser and glare-suppression optics. The optional diffuser and the optional glare-suppression optics or another exit window, may be arranged at a distance from the second face. Preferably, one or more of the diffuser and glare-suppression optics are present, and one or more of these are arranged at a non-zero distance from the second face.

Likewise, in yet a further embodiment, the illumination device may further optionally comprise a spacing downstream of the first face and upstream of one or more of the first diffuser and first face glare-suppression optics.

The spacing may contain a vacuum or may comprise a gas, such as air.

Especially, the optics downstream of the waveguide face(s) are not in optical contact with the waveguide face(s) or each other. Non-optical contact may be obtained by arranging the optics at distances such as at least about 5 μm, like at least about 10 μm, such as in the range of 5-500 μm, like 10-250 μm.

Optionally, the spacing between the waveguide and the first downstream optical element may be larger, such as in the range of 5-50 mm, such as 5-25 mm, like 10-15 mm.

The illumination device may in an embodiment further comprise a controllable attenuator, arranged to attenuate part of the first or second light. In this way, the ratio of the uplight and downlight may be controlled. Especially, the attenuator may comprise a device with an opening with a controllable opening size, such as a diaphragm. In an embodiment, the device comprises a plurality of openings with a controllable opening size.

In a specific embodiment, the illumination device comprises a plurality of waveguides.

This invention describes a way to extract light from a light guide which can be used for both up- and down lighting. It further allows the use of a thin, large-area heat sink, because the uplight part may require only a small part of the illumination device area.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1A:
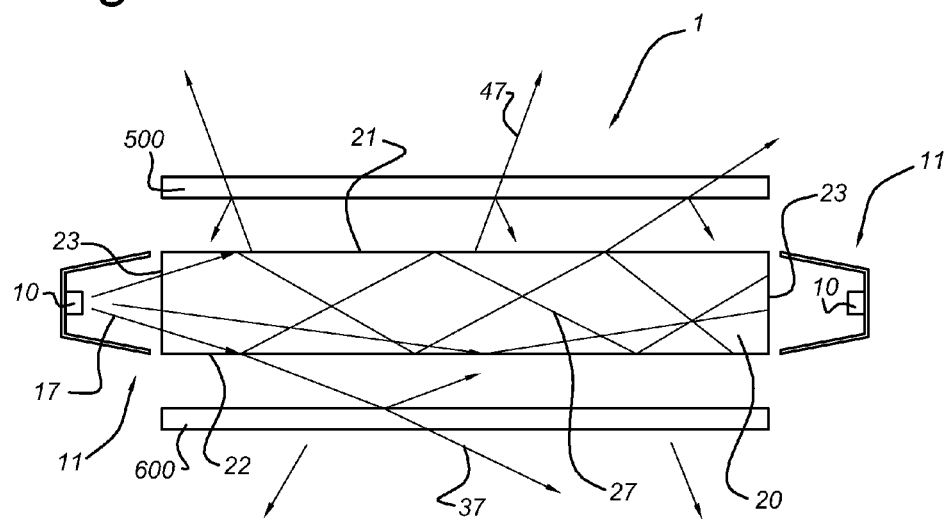
FIGS. 1a-1f schematically depict embodiments of the illumination device.

The drawings are not necessarily on scale. In the drawings, less relevant features like electrical cables or connections, ballasts, etc. have not been drawn, for the sake of clarity.

DETAILED DESCRIPTION

FIG. 1a schematically depicts an illumination device 1 according to an embodiment of the invention. The illumination device 1 comprises a waveguide element 20. This waveguide element 20 comprises a first face 21, which is also indicated as top face, and a second face, indicated with reference 22, which is also indicated as bottom face. The edge is indicated with reference 23. The waveguide 20 may be made of any material known in the art, such as transplant plastics, glass, etc. At the edge of the waveguide, a light source 10, especially a LED, is arranged, which is arranged to provide light 17, also indicated as LED light 17, for incoupling into the waveguide 20 via edge 23. Optionally, collimator optics 11 may be present, arranged to collimate at least part of the LED light 17 into the edge 23 of the waveguide 20. The light that enters the waveguide 20 via edge 23 will travel through the waveguide 20 and may reach top face 21.

The illumination device 1 further comprises a first transmissive reflector 500, which may reflect at least part of the light that might escape or escaped from the waveguide 20 at first face 21, and which transmits at least part thereof, to provide first face light or uplight 47 (which propagates away from first face 21), and a second transmissive reflector 600, which may reflect at least part of the light that might escape or escaped from the waveguide 20 at second face 22, and which transmits at least part thereof, to provide second face light or downlight 37 (which propagates away from second face 22). In this way a bi-directional luminaire is provided.

Preferably, at least one of the first face 21 and second face 22 comprises structures 51 (see embodiments described below) to couple out light 27, preferably via the second face 22 or first face 21, respectively, to provide light propagating in a direction away from second face or first face (37,47), respectively. The uplight to downlight ratio may amongst others be controlled by the reflectivity of the first transmissive reflector 500 and the second transmissive reflector 600, including the pattern 50 of the structures 51, such as dot/stripe density. The first transmissive reflector 500 and the second transmissive reflector 600 may include one or more of a diffuser (such as a diffuser plate or foil) and glare-suppression optics (such as a glare-suppression plate or foil), see also below.

Figure 1B:
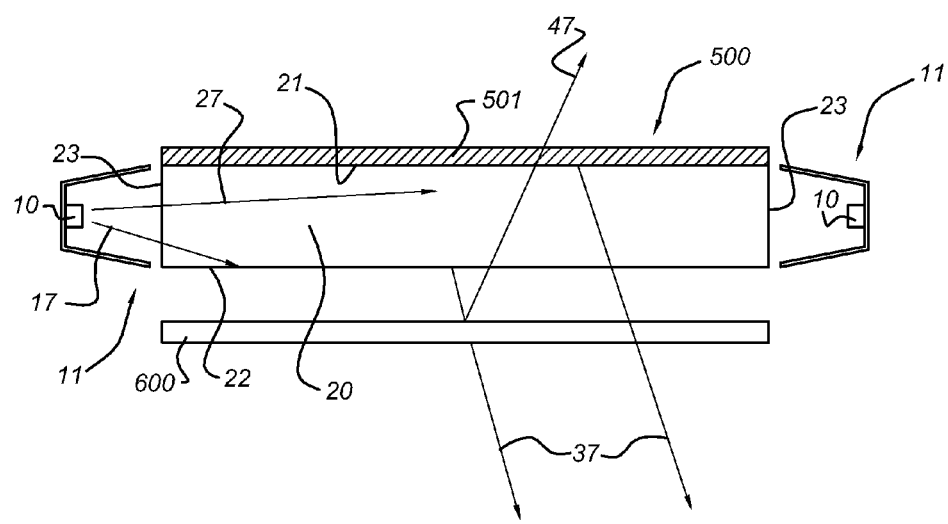

FIG. 1*b* schematically depicts an embodiment in which one or both of the transmissive reflectors is a coating on at least part of the first and/or the second face. The coating may be a thin layer of reflective material and/or a layer comprising openings, through which light may escape as up light or downlight. Preferably, the coating comprises structures 51, to enable outcoupling via an opposite face. In the schematic drawing the first transmissive reflector 500 comprises the coating, which is indicated with reference 501.

Figure 1C:
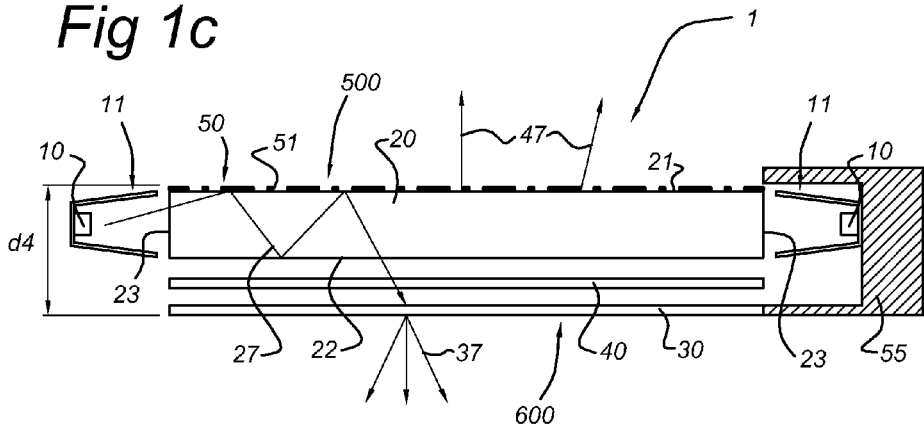

FIG. 1*c* schematically depicts an embodiment, in which one or both of the transmissive reflectors constitute(s) a pattern 50 of structures 51 on at least part of the first and/or the second face. In the schematic drawing the first transmissive reflector 500 comprises the pattern 50 of structures 51. The structure 50 may facilitate homogeneous outcoupling via an opposite face, here the second face 22. Further, the illumination device 1 comprises an optical film that may be used as a diffuser. The diffuser is indicated with reference 40. Further, the illumination device 1 comprises glare-suppression optics 30. Both the diffuser 40 and glare-suppression optics 30 will transmit light, but may also reflect at least part of the light back in the direction of the waveguide 20. Here, in this example, the second transmissive reflector 600 may thus comprise diffuser 40 and glare-suppression optics 30.

The up/down ratio of the light may be determined by the structure 50, such as the dot density, and the reflectivity of the front optical plates/foil stack, such as the diffuser 40 and glare-suppression optics 30.

Figure 1D:
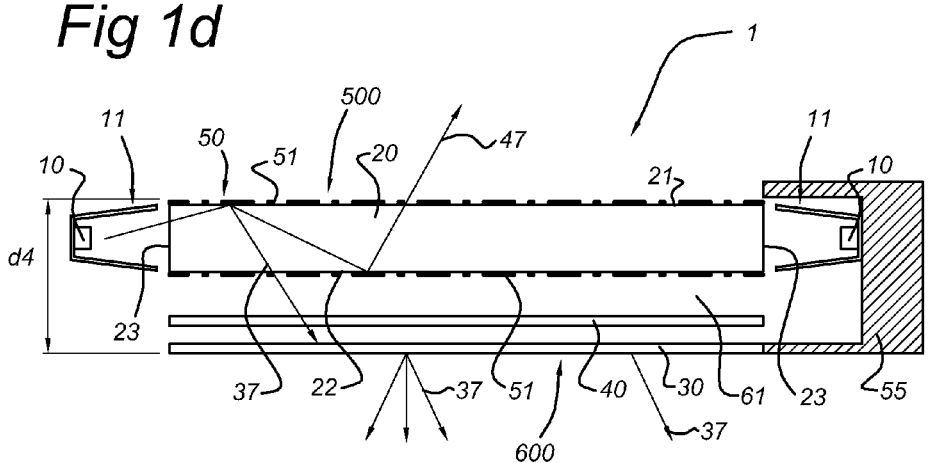

FIG. 1*d* is similar to FIG. 1*c*, with the exception that both transmissive reflectors 500,600 comprise structures 51, at the first face 21 and second face 22 of the light guide, respectively. In this embodiment, as schematically depicted, the second transmissive reflector 600 comprises a pattern 50 of structures 51 at second face 22 and diffuser 40 and glare-suppression optics 30. In principle, the diffuser 40 and glare-suppression optics 30 are optional. In the schematically depicted embodiment, there is a substantial spacing (void) between the second face and the diffuser 40.

Figure 1E:
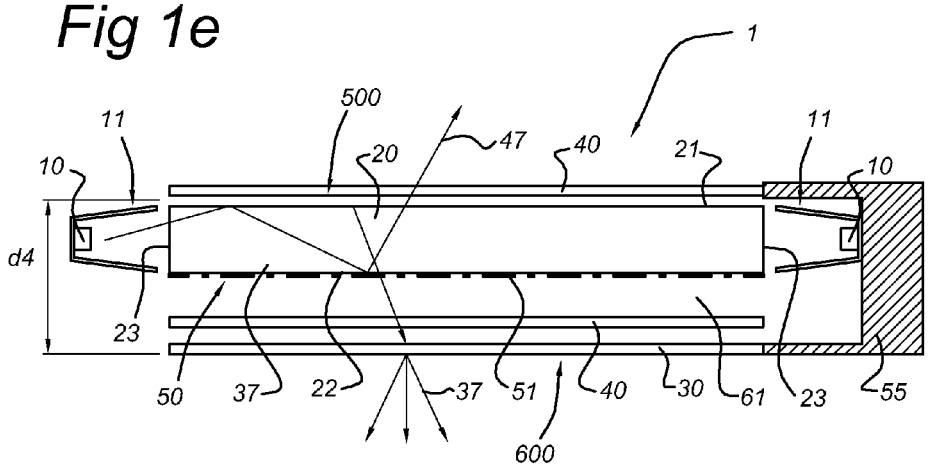

FIG. 1*e* is similar to FIG. 1*d*, with the exception that the first transmissive reflector 500 does not comprise structures 51 at the first face 21, but instead comprises an optical film such as diffuser 40.

Figure 1F:
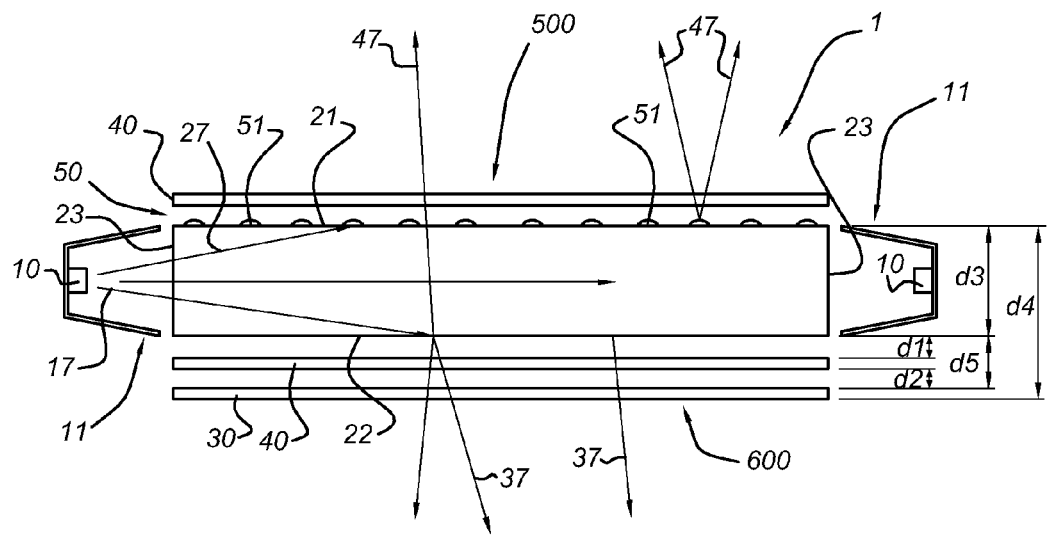

FIG. 1*f* schematically depicts an illumination device 1 according to an embodiment of the invention. The illumination device 1 comprises waveguide element 20. This waveguide element 20 comprises first face 21, which is also indicated as top face, and second face 22, which is also indicated as bottom face. The edge is indicated with reference 23.

At the edge 23 of the waveguide, light source 10, especially a LED, is arranged to provide light 17, also indicated as LED light 17, for incoupling into the waveguide 20 via edge 23. Optionally, collimator optics 11 may be present, arranged to collimate at least part of the LED light 17 into the edge 23 of the waveguide 20. The light that enters the waveguide 20 via edge 23 will travel through the waveguide 20 and may reach top face 21.

Top face 21 comprises structures 51, which are arranged to couple at least part of the light within the waveguide out of the waveguide element 20 and also via the second face 22. In this way second face light 37 (see below) is provided, which is also indicated as downlight. Hence, the structures 51 are arranged to couple out light from the waveguide 20 in a direction away from the first face 21. The structures 51 may form a pattern, which is indicated with reference 50.

Further, the illumination device 1 may comprise reflector 40, which is arranged to facilitate reflection of part of the light that escapes via first face 21, back into the waveguide 20. This light can again be used for outcoupling at other places of the waveguide 20. Essentially the waveguide 20 has two places where light may couple out, one place being the second face, or bottom face 22, and the other place being the first face, or top face 21. In this way the illumination device 1 is able to provide light in at least two directions. One direction is up, i.e. light escapes from the waveguide via first face 21 in a direction away from the second face 22. The other direction is via second face 22 in a direction away from the first face 21.

The illumination device 1 may further comprise optional diffuser 40 (here second face diffuser) arranged to promote mixing of the light escaped from the second face 22.

Further, the illumination device 1 may comprise glare-suppression optics 30 arranged to focus the light escaping from second face 22 in predetermined directions, such that glare may be minimized. The optional (second face) diffuser 40 may be arranged at a distance d1 from second face 22, which distance may be zero or larger (see also below). Further, the glare-suppression optics 30 may be arranged at a distance d5 from second face 22. The total thickness of the illumination device 1 including the optional diffuser 40 and the optional glare-suppression optics 30 is indicated with d4. The thickness of the waveguide 20 is indicated with d3.

Preferably, there is no optical contact between the optics. Hence, if applicable, the distance between the face and optional downstream optics, as well between further downstream optics, respectively, is preferably at least about 5 μm, like at least about 10 μm, such as in the range of 5-500 μm, like 10-250 μm. Therefore, in the embodiment schematically depicted in for example FIG. 1*f* and other Figures, distances d1 and d2 may be in the range of 5-500 μm.

Figure 2A:
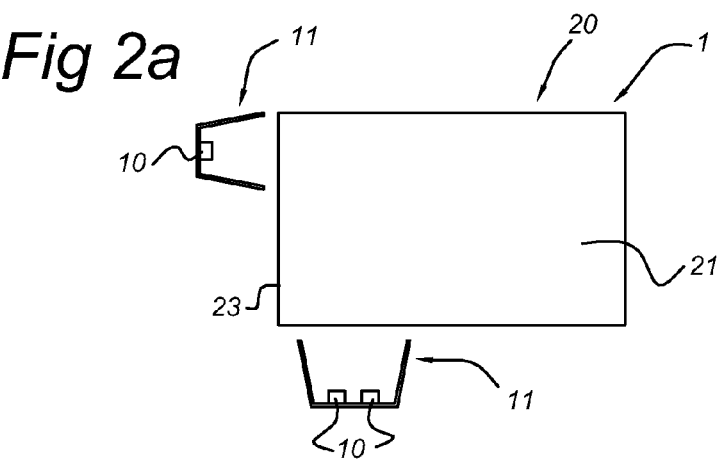
FIGS. 2a-2d schematically depict some shapes of the waveguide and arrangements of the LED light sources.

FIG. 2*a* schematically depicts an embodiment of the illumination device 1, seen in top view. By way of example, only a few light sources 10 are depicted. At one part of the edge 23, two LEDs 10 in one collimator 11 are depicted and at another part of the edge 23 one LED 10 in one collimator 11 is depicted. Dependent upon the way the structures 51 (not shown in this Figure) are provided, the LED sources 10 may be provided at any desired position. There may be no necessity to arrange the LED light sources 10 evenly or symmetrically.

Figure 2B:
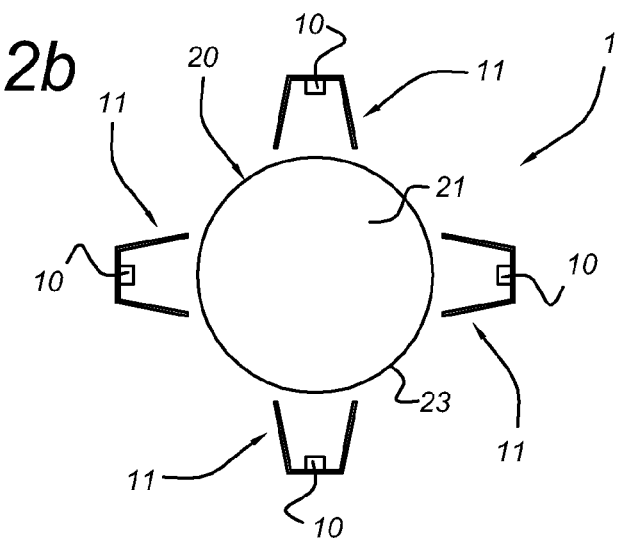
Figure 2C:
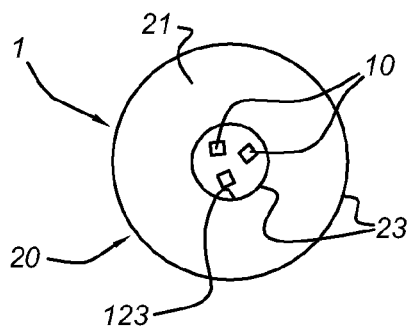
Figure 2D:
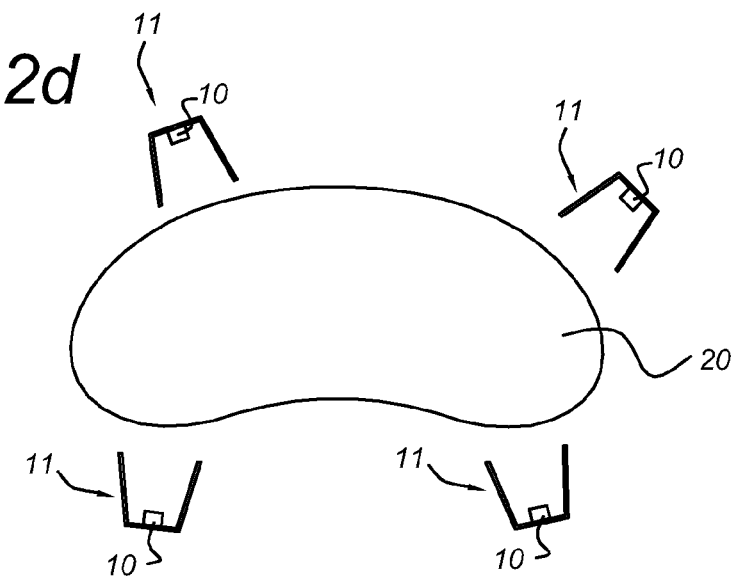

FIGS. 2*b*, 2*c*, and 2*d* schematically depict a number of possible embodiments. In FIG. 2*b*, a round waveguide 20 is depicted as a plurality of LED light sources 10 arranged around the edge 23. In FIG. 2*c*, schematically an embodiment of the illumination device 1 is depicted, wherein the waveguide 20 is again round, but the LED light sources 10 are arranged in a central cavity. FIG. 2*d* schematically depicts the freedom of shape that the illumination device 1 may have.

Figure 3A:
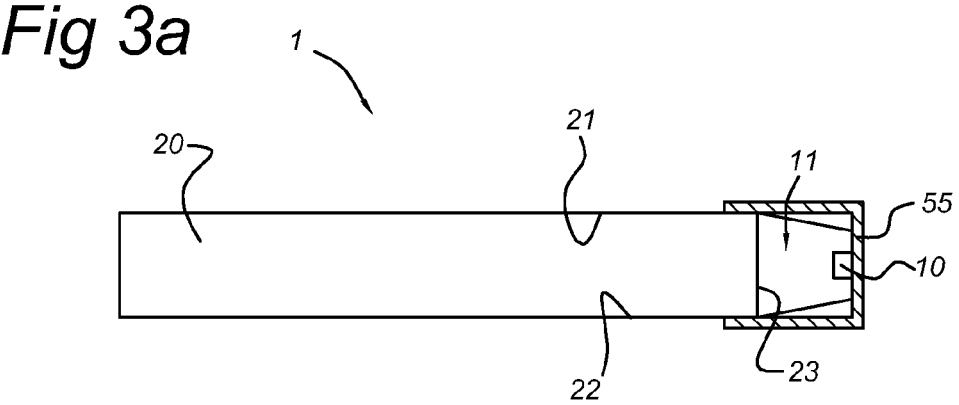
FIGS. 3a-3c schematically depict some specific embodiments of the illumination device.
Figure 3B:
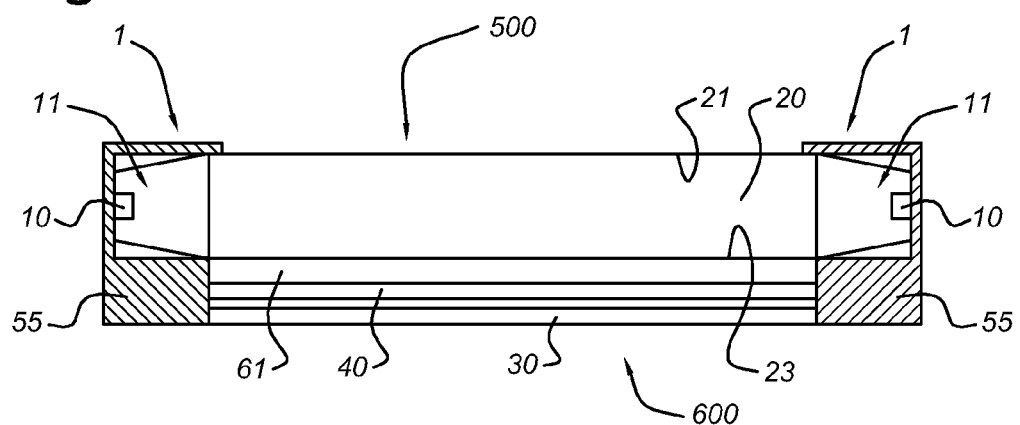
Figure 3C:
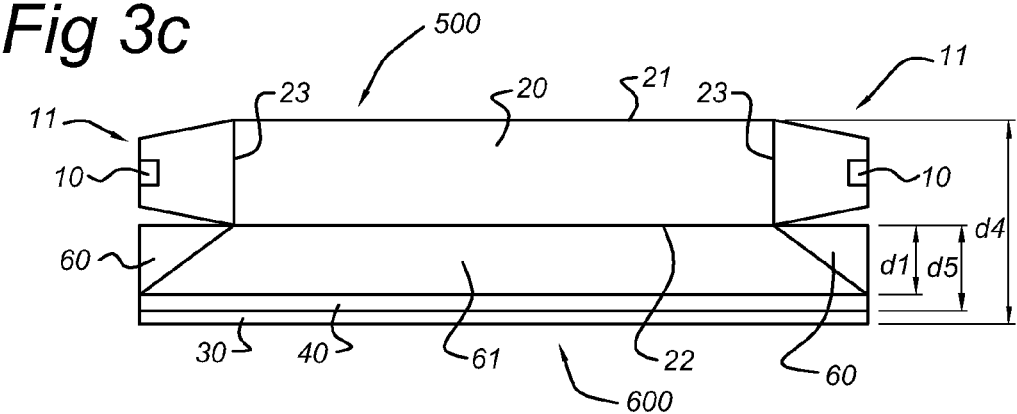

FIGS. 3*a*, 3*b*, and 3*c* schematically depict further embodiments of the illumination device 1 according to the invention. FIG. 3*a* schematically depicts an embodiment of the illumination device 1, further comprising a heat sink 55. This heat sink may be in physical contact with the LED light source 10 and/or the optional collimator 11. Further, heat generated within the waveguide 20 may escape via heat sink 55, which may thus be in physical contact with at least part of the first face 21 (comprising the structures 51).

FIG. 3b schematically depicts the same embodiment as FIG. 3a, with the exception that also the optional diffuser 40 and the optional glare-suppression optics 30 are present. The heat sink 55 may also be in physical contact with the optional diffuser 40 and/or the glare-suppression optics 30. Hence, also heat generated in the diffuser 40 and/or the glare-suppression optics 30 may dissipate via heat sink 55.

FIG. 3c schematically depicts an embodiment in which a void 61 is present. Such a spacing 61 may be provided by arranging the diffuser 40 and the glare-suppression optics 30 at a distance from second face 22. As mentioned above, the distance between second face 22 and the diffuser 40 is indicated with d1. Further reflectors 60 may be provided to provide a closed spacing 61. Thus, the spacing 61 may be an enclosure, enclosed by second face 22, reflectors 60 and one or more of the diffuser 40 and glare-suppression optics 30. Even when using such a spacing 61, the thickness of the illumination device 1 may be small. For instance, the thickness d4 may be in the range of 5-50 mm.

Figure 4:
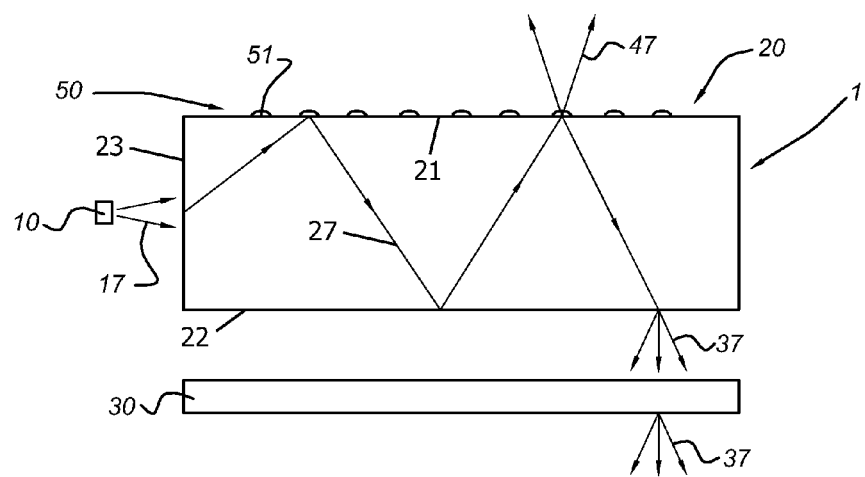
FIG. 4 schematically depict some principles of the illumination device.

FIG. 4 schematically depicts how the illumination device 1 may function. The LED light source 10 provides light 17 which is coupled into the waveguide 20 via edge 23. The light within the waveguide 20 is indicated with reference 27. This light may be reflected at the edges and faces of the waveguide 20. At some place, light 27 may be reflected at structure 51 in a direction away from the first face 21 to the second face 22. This light may escape from the waveguide 20. Light escaped from the waveguide 20 via second face 22 to optics 30 is indicated with reference 37, which is herein also called second face light or downlight 37. A part of the light 27 within the waveguide may also escape, due to the structures 51, via first face 21 and may in this way escape from the illumination device 1 in a direction away from second face 22. This light is indicated with reference 47 and is herein also indicated as first face light or uplight 47.

Figure 5:
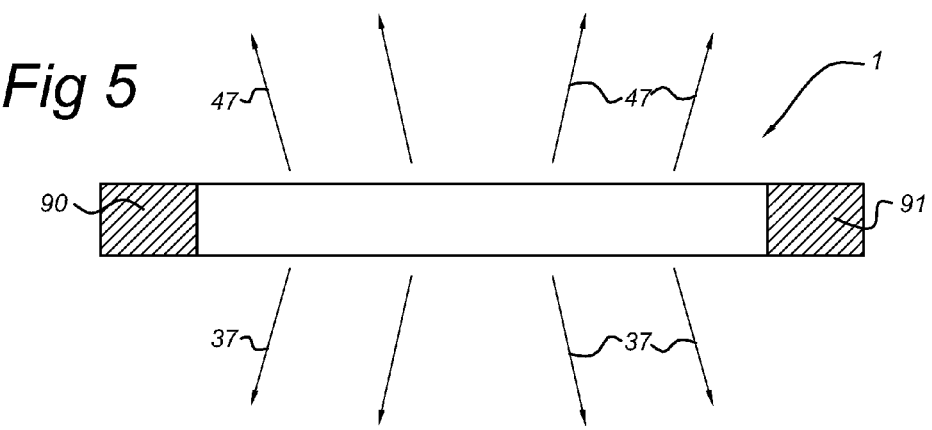
FIG. 5 schematically shows an example of the illumination device.

FIG. 5 schematically depicts how the illumination device 1 may function. It shows optics compartment 91, in which the LED light source 10, and the optional optics 11 and heat sink 55 may be comprised; and this Figure shows how light may escape from the illumination device 1. Light may escape from second face 22 as downlight 37 and light may escape from first face 21 as uplight 47.

Figure 6A:
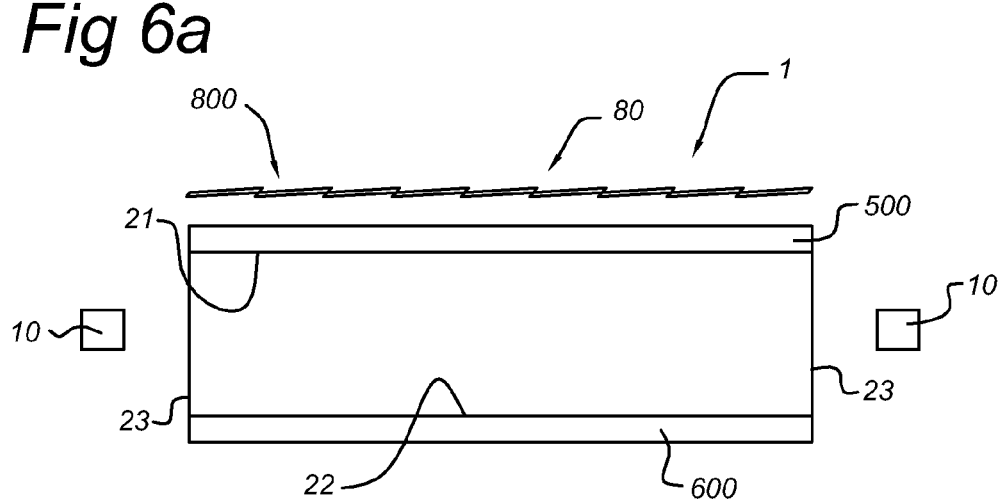
FIGS. 6a-6b schematically depict some specific embodiments of the illumination device.
Figure 6B:
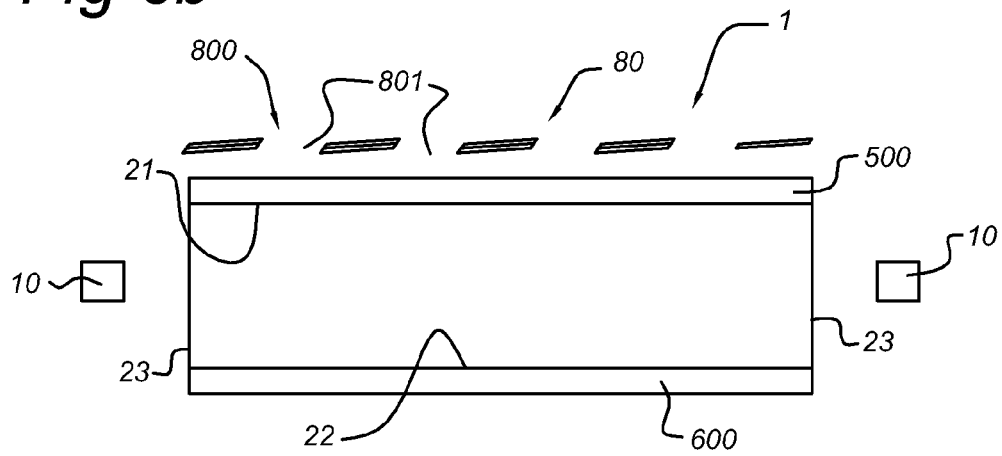

FIGS. 6a-6b schematically depict an embodiment in which the illumination device 1 further comprises a controllable attenuator 80, arranged to attenuate part of the first light 37 or second light 47. Here, the attenuator 80 is arranged to attenuate part of the second light 47, and is situated downstream of the first face 21. For instance, the attenuator 80 may comprise a device 800 with an opening 801 with a controllable opening size. Such opening 801 with controllable opening size may be a diaphragm. The device 800 may also comprise two or more plates with holes; by moving one or more plates an openings 801 with variable opening size is obtained. The device 800 may comprise a plurality of openings 801 with a controllable opening size. Preferably, the waveguide side of the attenuator 80, such as device 800, is reflective.

Further Specific Embodiments

The basic embodiment may consist of a transparent polymer (e.g. PMMA) rectangular light guide plate provided with a screen printed (or ink jet printed) pattern of outcoupling dots or stripes ("white paint") on the upper side. Light from a LED array is (preferably) collimated and injected into the light guide. The dot pattern density is optimized in such a way that light is coupled out uniformly over the whole area of the waveguide. The emitted light may be collimated by a prismatic plate or foil (such as an MLO (micro lighting optics plate/prismatic plate (WO2006097859). This plate ensures effective glare control. The dot patterns may be optimized using the Backlight Pattern Optimiser (BPO) in LightTools 6.1. (supplier: Optical Research Associates).

The LED array may in an embodiment consist of both "cool white" and "warm white" LEDs. The two LED types are placed in an alternate sequence CW (cool white)-WW (warm white)-CW-WW-CW- . . . . A color uniform light output is determined by the pitch (p) of one LED type and the distance between the emitting surface of the LEDs and the light guide entrance (L). Good uniformity is reached when p/L>1. The LEDs can be placed on both (long) edges of the light guide (for a thermal reason), although many other configurations are possible. Other LED combinations are also possible (R-G-B, R-G-B-A, CW-A, . . . )(A=amber). Alternatively, CW-WW-red can be applied. Characteristic CW and WW LED number ratios may be in the range of 0.5<CW/WW<2, such as CW/WW=1:1 (i.e. n LEDs CW:n LEDs WW).

The way light is injected into the light guide determines (part of) the total optical efficiency of the system. In general, a collimated LED beam injected into the light guide improves optical efficiency as compared to Lambertian LEDs, placed close to the light guide (without any collimation). On the other hand, when this beam is too collimated, efficiency may drop again. In a typical example, an array of Rebel LEDs is collimated by placing the LEDs in a Compound Parabolic Concentrator (CPC) type linear reflector. The CPC is elongated by a straight part to fulfill the requirements of uniform incoupling (see p/L ratio above). The typical exit angle (in air) is 37° and gives optimum total optical efficiency. Other configurations and other ways to collimate are possible, depending on mechanical restrictions or aesthetical requirements.

A relevant element in the invention is that a well-defined portion of the light flux is directed in downward direction (e.g. 80%) and the rest is directed in upward (ceiling) direction (e.g. 20%). The light travelling in the upward direction does not need not to be collimated and may have essentially a Lambertian character. Alternatively, a batwing intensity may also be provided. Downstream of the first face comprising the structures, further optics may be provided to tune the uplight beam shape. The up/down ratio may amongst others be determined by the reflectivity of the collimator plate (and optional foils) and the density of the outcoupling dots or stripes on the light guiding plate.

The shape of the modules is not restricted to simple squares. In principle, all arbitrary (2D) shapes are possible. Full freedom (3D) can be achieved when the light guides are thin enough to bend (e.g. <2 mm).

In another embodiment a substantial air gap is introduced between the light guide and the MLO plate (FIG. 3c). This allows us to design illumination devices without edge or bezel. Part of the LED collimator unit is now hidden in the cavity between the light guide and the collimator. The width of the bezel is determined by the amount of collimation and mixing length required. Optical structuring of the entrance of the light guide helps to further reduce the mixing length and to make a more aesthetic illumination device. The thickness of the illumination device may for instance be in the 15-25 mm range. This design is also much more tolerant for color variations close to the incoupling sides.

When looking into the illumination device one may be able to see the combined effect of the MLO structure and the pattern printed on the light guide. The effects can be subtle and highly decorative, but also undesired Moire effects may occur which is often considered as unwanted. To remove these effects completely, a holographic diffuser can be placed between the light guide and the collimator. These materials may create a very smooth luminance surface. When e.g. an elliptical diffuser is used, light is scattered preferably in the direction of the LED array. These strategies also help to smooth color variations.

The use of holographic foils also helps when a low LED density is required. In this case, large outcoupling dot gradients may be needed, which can be "made invisible" by using the proper holographic diffuser.

Calculations show that there is always a trade-off between the up/down flux ratio and the optical efficiency of the illumination device. To tune the up/down ratio while keeping the optical efficiency at a very high level, the outcoupling dots or stripes can be printed on both sides of the light guide. These strategies are useful when you construct a wall-mounted illumination device where you need collimated light in both up and down directions.

The construction is not limited to a single light guide. When using two light guides it becomes possible to make a system having a dynamic up/down ratio. Also the color of the upward and downward beam can be different. Various other combinations are possible. For instance, in an embodiment a stack of waveguides is applied, wherein preferably each waveguide is provided with one or more accompanying LED light sources, and wherein the stack preferably comprises the first and the second face.

Above, a description has been given of a visual impression of the illumination device. Up to now a constant luminance exit surface was designed by the creation of a well-defined light extraction pattern. An additional feature which can be added is the incorporation of more complex luminance patterns. The luminance of the exit surface may vary in a periodic or random way. One could make all kinds of geometric patterns or create a unique pattern related to the preference of the customers. Also optical illusions (depth, movement) can be incorporated in the design.

Key aspects for high total optical efficiency may be:

Collimation of the light of the (Lambertian) LEDs to some extent.

Minimization of undesired absorptions:

Low absorption loss in the light guide plate.

The LEDs on a PCB could be covered with a reflector sheet (MCPET) where the LEDs stick through holes in this sheet.

Maximum possible coverage of the light guide by outcoupling structures.

The invention may be highly relevant for office lighting, although also other application areas may be envisaged: lighting modules for retail applications; consumer lighting systems.

Example

With reference to FIGS. 1f, 4 and 5, a rectangular light guide (length=500 mm, width=150 mm (d3), height=6 mm (d4), refractive index=1.50) is connected to 2 LED arrays on the long sides. LED-type and pitch is neglected in this example. The Lambertian LEDs are placed in a CPC-type collimator (width=6.34 mm) having a maximum exit angle of 37 degrees. This collimation angle ensures an optimum optical efficiency. White dots (squares: 0.5 mm×0.5 mm) are placed on the upper part of the light guide (face 21). By playing with the maximum allowed "white density", the amount of flux to the ceiling (47) and to the floor(table) (37) can be carefully tuned. The luminance of the exit window (downward glare-free beam) of the luminaire is completely uniform, independent of the luminaire up/down flux ratio! The luminance of the exit window creating the upward light is not uniform.

When the reflectivity of the (front) MLO plate (30) is 40% and the maximum white density is 70%, the optical efficiency is 72.5%. In this construction the upward flux fraction (47) is 21.3% (of the total flux produced) and the downward flux fraction is 78.7% (37). The calculated efficiency is "worst case", because it is assumed that all light which comes back to the LEDs (and to the area between the LEDs) is absorbed. In practice, an optical efficiency>80% seems feasible. Another aspect, favorable for obtaining a high efficiency, is that light reflected at the front MLO plate is only partly "recycled" (in contrast to a conventional light box having only one exit surface). The total thickness (d4) of this luminaire (1) is (including mechanics) ~10 mm.

The terms "corresponding" and "respective" are used to indicate a predominantly one-to-one relationship between a first item and a second item. For example, "each imaging lens of the plurality of imaging lenses is arranged to image a corresponding segment pattern of the plurality of segment patterns into a respective projection image of a plurality of projection images" has to be understood in the sense that any one of the imaging lenses is arranged to image predominantly one specific segment pattern into one specific projection image.

Throughout this document, the terms "blue light" or "blue emission" especially relate to light having a wavelength in the range of about 410-490 nm. The term "green light" especially relates to light having a wavelength in the range of about 500-570 nm. The term "red light" especially relates to light having a wavelength in the range of about 590-680 nm. The term "yellow light" especially relates to light having a wavelength in the range of about 560-590 nm. The term "light" herein especially relates to visible light, i.e. light having a wavelength selected from the range of about 380-780 nm.

The term white light herein, is known to the person skilled in the art. It especially relates to light having a correlated color temperature between about 2,000 and 20,000 K, especially 2700-20,000 K, for general lighting especially in the range of about 2700 K to 6500 K, and for backlighting purposes especially in the range of about 7,000 K to 20,000 K, and especially within about 15 SDCM (standard deviation of color matching) from the BBL (black body locus), especially within about 10 SDCM from the BBL, even more especially within about 5 SDCM from the BBL. The term "predetermined color" may relate to any color within the color triangle, but may especially refer to white light.

Unless indicated otherwise, and where applicable and technically feasible, the phrase "selected from the group consisting", a number of elements" may also refer to a combination of two or more of the enumerated elements.

Terms like "below", "above", "top", and "bottom" relate to positions or arrangements of items which would be obtained when the multi-beam illumination system is arranged substantially flat on a substantially horizontal surface with the lighting system bottom face substantially parallel to the substantially horizontal surface and facing away from a ceiling into a room. However, this does not exclude the use of the multi-beam illumination system in other arrangements, such as against a wall, or in other, e.g. vertical arrangements.

The term "substantially" herein, such as in "substantially flat" or in "substantially consists", etc., will be understood by the person skilled in the art. In embodiments, the adjective substantially may be removed. Where applicable, the term "substantially" may also include embodiments with "entirely", "completely", "all", etc. Where applicable, the term "substantially" may also relate to 90% or higher, such as 95% or higher, especially 99% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in sequences other than those described or illustrated herein.

The devices referred to herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The term "and/or" includes any and all combinations of one or more of the associated listed items. The article "a" or "an" preceding an element does not exclude the presence of a plurality of such elements. The article "the" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination device, arranged to generate first and second light in opposite directions, comprising
    a waveguide element comprising a first face, a second face, and a waveguide edge;
    a LED light source comprising collimating optics and arranged to generate light source light, wherein the LED light source is arranged to couple at least part of the light source light into the waveguide element via the waveguide edge of the waveguide element to provide waveguide light;
    a first transmissive reflector, arranged at the first face side, and a second transmissive reflector, arranged at the second face side, wherein the LED light source, the waveguide element, the first transmissive reflector, and the second transmissive reflector, are arranged to generate the first and the second light in a direction away from the first face and in a direction away from the second face, respectively; and
    a controllable attenuator, arranged to attenuate part of the first or second light, wherein the attenuator comprises a device with an opening with a controllable opening size.

2. The illumination device according to claim 1, wherein one or more of the first transmissive reflector and the second transmissive reflector comprise structures arranged at the first face and/or second face, for coupling at least part of the waveguide light out of the waveguide element via the second face and/or first face.

3. The illumination device according to claim 1, wherein the first face comprises structures, arranged to couple at least part of the waveguide light out of the waveguide element via the second face, as first transmissive reflector.

4. The illumination device according to claim 1, wherein the first face comprises a pattern of reflective dots or stripes as structures.

5. The illumination device according to claim 1, wherein the first face comprises a coating, arranged to reflect at least part and transmit at least part of the waveguide light at the first face, as the first transmissive reflector.

6. The illumination device according to claim 1, comprising a diffuser, arranged downstream of the first face.

7. The illumination device according to claim 1, wherein the second face comprises structures, arranged to couple at least part of the waveguide ht out of the waveguide element via the first face, as the second transmissive reflector.

8. The illumination device according to claim 7, wherein the second face comprises a pattern of reflective dots or stripes as structures.

9. The illumination device according to claim 1, wherein the second face comprises a coating, arranged to reflect at least part and transmit at least part of the waveguide light at the second face, as the second transmissive reflector.

10. The illumination device according to claim 1, comprising a diffuser arranged downstream of the second face.

11. The illumination device according to claim 1, further comprising glare-suppression optics, arranged downstream of the second face.

12. The illumination device according to anyone of the claim 1, further comprising a heat sink in thermal contact with the first face.

13. The illumination device according to claim 1, further comprising a diffuser and a glare-suppression optics, arranged downstream of the second face, and defining a spacing arranged upstream of one or more of the diffuser and glare-suppression optics and downstream of the second face.

* * * * *